(12) United States Patent
Zhou et al.

(10) Patent No.: US 12,247,900 B2
(45) Date of Patent: Mar. 11, 2025

(54) HIGH-ORDER VORTEX VIBRATION WIND TUNNEL TEST MODEL SYSTEM FOR LONG-SPAN BRIDGE AND TEST METHOD THEREOF

(71) Applicants: China Construction 5th Engineering Bureau Co., Ltd, Changsha (CN); Hunan University, Changsha (CN)

(72) Inventors: Shuai Zhou, Changsha (CN); Xugang Hua, Changsha (CN); Zhengqing Chen, Changsha (CN); Wen Chen, Changsha (CN); Cong Fang, Changsha (CN); Zhiwen Huang, Changsha (CN)

(73) Assignees: China Construction 5th Engineering Bureau Co., Ltd., Changsha (CN); Hunan University, Changsha (CN)

( * ) Notice: Subject to any disclaimer, the term of this patent is extended or adjusted under 35 U.S.C. 154(b) by 457 days.

(21) Appl. No.: 17/823,161

(22) Filed: Aug. 30, 2022

(65) Prior Publication Data
US 2023/0160777 A1 May 25, 2023

(30) Foreign Application Priority Data
Nov. 22, 2021 (CN) .......................... 202111388714.0

(51) Int. Cl.
G01M 9/08 (2006.01)
G01M 9/04 (2006.01)
G01M 9/06 (2006.01)

(52) U.S. Cl.
CPC .............. *G01M 9/062* (2013.01); *G01M 9/04* (2013.01)

(58) Field of Classification Search
CPC .............................. G01M 9/08; G01M 5/0008
See application file for complete search history.

(56) References Cited

U.S. PATENT DOCUMENTS 4,372,158 A * 2/1983 Doggett, Jr. ............ G01M 9/04
73/147

FOREIGN PATENT DOCUMENTS

CN 109115450 * 1/2019

OTHER PUBLICATIONS

Zhu, Q et al. Vortex-induced vibration analysis of long-span bridges with twin-box decks under non-uniformly distributed turbulent winds; Journal of Wind Engineering & Industrial Aerodynamics 172 (2018) 31-41 (Year: 2018).*

* cited by examiner

*Primary Examiner* — Jamel E Williams
*Assistant Examiner* — Alex T Devito
(74) *Attorney, Agent, or Firm* — Andrew D. Fortney; Central California IP Group, P.C.

(57) ABSTRACT

A vortex vibration wind tunnel test model system for a long-span bridge and a test method thereof is disclosed. In the test model system, the base is provided with a plurality of adjustment members, each of the adjustment members is provided with a cantilever rod, and all of the cantilever rods are cantilevered in the same direction; a beam body model is provided on a cantilevered end of all of the cantilever rods; a displacement measuring member is provided below the cantilever rod, and the horizontal distance between the displacement measuring member and the beam body model exceeds 2 times a width value of the beam body model, the displacement measuring member being away from the surface of the beam body model and the position of directly below the beam body model. Therefore, the state response data of the position of the cantilever rod can be collected in real time. By calculating the state response data of the cantilever end of the cantilever beam, the state response data of the beam body model is obtained, which effectively reduces the damping of the model system and improves the (Continued)

accuracy of the model technical parameters. The test method is simple and reliable, which improves the real reliability of the wind tunnel test data, and can effectively meet the requirements of the high-order vortex vibration wind tunnel test for the long-span bridge.

24 Claims, 8 Drawing Sheets

HIGH-ORDER VORTEX VIBRATION WIND TUNNEL TEST MODEL SYSTEM FOR LONG-SPAN BRIDGE AND TEST METHOD THEREOF

TECHNICAL FIELD

The present invention relates to the technical field of bridge wind engineering test, and in particular to a vortex vibration wind tunnel test model system for a long-span bridge and a test method thereof.

BACKGROUND ART

Modern long-span bridges (with a main span being generally over 1000 meters) generally adopt the basic structural forms of suspension bridges and cable-stayed bridges, and their gentle structural characteristics make wind-resistant design become one of the controlling factors in the design of such long-span bridges. Vortex-induced resonance (VIR) of bridges is one of the most common phenomena in structural wind-induced vibration. It is a limited self-excited vibration with amplitude of not more than 30 cm, which has not been paid enough attention in the past. Since 2000, multi-order vertical-bending modal vortex-induced resonance has occurred in Great Belt Bridge of Denmark, Humen Bridge of Guangdong, Wuhan Yingwuzhou Bridge, Xihoumen Bridge and other long-span suspension bridges with a world-class design level. As the vibration acceleration increases by the square of the frequency at the same amplitude, the higher-order modal vortex vibration is more harmful. The existing vortex vibration wind tunnel test is mainly based on the rigid segment modal, which can not distinguish the high-order modal from the low-order modal. For example, the full-bridge aeroelastic model (the structure uses the core beam to provide structural rigidity, and the outer clothing to ensure the preparation of the wind tunnel test aeroelastic model by the way of combining the appearance) can only simulate a few 2-3 order vertical bending modals, and the taut strip model cannot simulate the frequency distribution characteristics of the suspension bridge, which both cannot be used to study the high-order vortex vibration of the suspension bridge.

Figure 1:
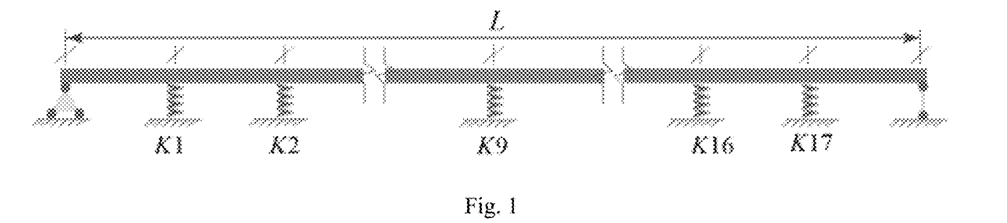
FIG. 1 is a schematic diagram of a conventional aeroelastic model of multi-point elastic supported continuous beams in a wind tunnel test.

In this regard, Zhou Shuai (Reference paper: Zhou Shuai; Chen Zhengqing; Hua Xugang; Study on High-order Vortex Amplitude Wind Tunnel Test for Long-span Bridges [J]. Vibration and Shock. 2017, No. 018), Wenqing (Reference paper: Wenqing; Study on high-order modal vertical vortex vibration amplitude prediction method for long-span flexible bridges [A]; 2017) Hua Xugang (Reference paper: Hua Xugang; Huang Zhiwen; Chen Zhengqing; Multi-mode vertical vortex vibration and control for long-span suspension bridges [J]; China Journal of Highway and Transport; October 2019) et al. established the aeroelastic model of multi-modal vortex-induced vibration of a multi-point elastic supported continuous beams to simulate the aeroelastic model of the multi-point elastic supported continuous beams. As shown in FIG. 1, the stiffness system of the aeroelastic model is provided by support stiffness from the flat steel core beam inside the model and the cantilever beam outside the model. Specifically, the vertical stiffness of the aeroelastic model is provided by 17 steel wires (K1-K17) arranged at equal intervals together with the steel core beam inside the model. The bending stiffness of the steel wires is converted into the vertical stiffness at the support point of the model by the way of cantilever beam angling. Each steel wire provides a horizontal supporting force by several acceleration sensors arranged on the central axis of the upper surface of the model, and both ends of the model respectively provided with constraint devices, a vertical constraint and a horizontal longitudinal constraint being arranged at the left side, and a vertical constraint being provided on the right side. The aeroelastic model of multi-point elastic supported continuous beams breaks through the bottleneck that the traditional aeroelastic model cannot simulate the high-order vertical bending mode of suspension bridges. To solve this technical problem, the problem of multi-point elastic supported continuous beam vortex vibration of suspension bridges is equivalently treated as the problem of multi-point elastic supported continuous beam vortex vibration, so that the simulation of high-order vortex vibration of suspension bridges is realized.

However, whether it is a conventional aeroelastic model or a multi-point elastically supported continuous beam aeroelastic model, there are following disadvantages.

1. At present, the sensors (such as acceleration sensors and displacement sensors) for collecting the displacement state data of the beam body model are generally arranged directly on the surface of the beam body model, and the sensors are arranged together with the beam body model in the wind field, they will bear the action of wind load and will interfere with the wind field, which will affect the beam body model. As the wind tunnel test model has very high requirements for the dimension of the beam body model and has very high sensitivity to the wind field, not only the sharp corners and rounded corners of the beam body model will have a great impact, but also the sensors attached on the surface of the beam body model will directly affect the shape of the beam body model. Therefore, it will affect the wind field simulation and directly affect the accuracy of the model test. That is, the existing wind tunnel aeroelastic model test has its strict requirements for the shape similarity of the existing wind tunnel aeroelastic model test as well as the wind field around the model. The surface arrangement of the sensor changes the aerodynamic shape of the model to a certain extent. At the same time, the signal power lines of the sensors cannot avoid winding on the model, and have a certain contact area with the model, increasing the damping of the model, resulting in that the technical parameters of the model do not meet the test requirements, and seriously affecting the accuracy and authenticity of the wind tunnel test results.

2. Although the existing laser sensors can be placed below the beam body model and do not directly contact the beam body model, the laser sensors located below the beam body model will also have a turbulent effect on the wind field when the wind field flows through the beam body model, resulting in increased damping and uncertainty, and also leading to the inability to accurately evaluate the effect on the wind field simulation results;

3. The existing aeroelastic model of multi-point elastic supported continuous beams simulates the main beam of a real suspension bridge to carry out two-end restraint. When the two-end restraint of the model is tested, it is found that the two-end restraint is carried out by two-end pillars, with the surface provided with grooves to adapt to the core beam of the model. The core beam can move freely in the grooves in the longitudinal direction, and supports in the vertical grooves to provide a supporting force to resist gravity. Since the weight of the model is very light, the two-end restraint is very sensitive to static friction and sliding friction. Adopting the two-end restraint will add additional damping to the model, directly affecting the wind tunnel test results of the aeroelastic model, thus affecting the accuracy of the results.

SUMMARY OF THE INVENTION

The object of the present invention is to overcome the problems existing in the prior art that a sensor arranged on the surface of an aeroelastic model of multi-point elastic support continuous beams changes the aerodynamic shape of the model to a certain extent, and a signal power line of the sensor cannot be wound around the model, which increases the damping of the model; the technical parameters of the model do not meet the test requirements, seriously affecting the accuracy and authenticity of the wind tunnel test results; the placement of the sensor below the model in the prior art would bring about turbulent flow to the wind field, thereby increasing the wind field damping of the model, which would have uncertainty and would also lead to the above-mentioned deficiencies of not being able to accurately evaluate the influence on the wind field simulation results. It provides a vortex vibration wind tunnel test model system for a long-span bridge, and at the same time provides a test method for a vortex vibration wind tunnel test model system for a long-span bridge.

In order to achieve the purpose, the invention provides the following technical solutions.

A high-order vortex vibration wind tunnel test model system for a long-span bridge comprises a base, wherein the base is provided with a plurality of adjustment members, each of the adjustment members is provided with a cantilever rod, and all of the cantilever rods are cantilevered in the same direction; each of the adjustment members can adjust the position and the cantilever angle of the cantilever rod clamped, and a beam body model is provided on a cantilever end of all of the cantilever rods; and a displacement measuring member is provided below each of the cantilever rods, and a horizontal interval of the displacement measuring member with respect to the beam body model exceeds 2 times a width value of the beam body model.

According to a high-order vortex vibration wind tunnel test model system for a long-span bridge of the present invention, several adjustment members are provided on the base, a cantilever rod is provided on each adjustment member, all the cantilever rods are cantilevered in the same direction, and a beam body model is provided on the cantilevered end of all the cantilever rods. Since the cantilever rod is equivalent to a cantilever beam structure with one end fixed and one end free and the length, density and cross section thereof are fixed, the modal vibration mode of the cantilever rod is also fixed, and the ratio of the vibration response of the cantilevered end of the cantilever rod to the vibration response at any position along the length of the cantilever rod is fixed. According to the response data of a certain position of the cantilever rod collected by the first-order modal vibration mode and the displacement measuring member, the vibration response of any position on the length of the cantilever rod can be obtained, including the vibration response of the cantilever end of the cantilever rod, i.e. the vibration response of the beam body model above the cantilever rod can be correspondingly obtained.

In the present invention, the displacement measuring member is arranged below the cantilever rod, and the horizontal distance between the displacement measuring member and the beam body model exceeds 2 times a width value of the beam body model, and is far away from the surface of the beam body model and the position directly below the beam body model. It can not only collect the state response data of the position of the cantilever rod in real time to calculate the state response data of the cantilever end of the cantilever rod, namely, the state response data of the beam body model can be obtained, which not only overcomes the deficiency that the change of the aerodynamic profile caused by arranging the sensor on the surface of the model in the traditional aeroelastic model increases the damping of the model, and the technical parameters of the model do not meet the test requirements, seriously affecting the accuracy and authenticity of the wind tunnel test results, and solves the problem that the placement of sensors will bring turbulence to the wind field, thus increasing the wind field damping of the model, with uncertainty, also leading to be unable to accurately evaluate the impact on the wind field simulation results. The present invention thus effectively reduces the damping of the model system, further improves the accuracy of the model technical parameters, and improves the real reliability of the wind tunnel test data, which is able to effectively meet the requirements of high-order vortex vibration wind tunnel test for long-span bridges and contributes to the study of high-order modal vortex vibration wind tunnel test for long-span bridges. It can provide technical support for multi-order vortex vibration damping for long-span flexible bridges built and wind resistance design of new bridges. Of course, the high-order vortex vibration wind tunnel test model system for the long-span bridge according to the present invention is also applicable to the study of low-order vortex vibration wind tunnel test.

It should be noted that after the experimental study, the displacement measuring member according to the present invention is located at a position of a distance of twice the width of the beam body model from the wake flow or downstream of the beam body model, and the influence of the displacement measuring member on the vortex of the wake flow in the wind field and the disturbance of the flow field is very small and almost negligible. Meanwhile, when measuring the vibration response parameter of the cantilever rod, the displacement measuring member makes measurement in contact or not in contact, hardly damping the cantilever rod, and can be considered as a non-inductive displacement measuring member.

Preferably, the displacement measuring member is located at a position below the cantilever rod close to the adjustment member. The displacement measuring member is located between the adjustment member and the cantilever end. When the displacement measuring member is closer to the adjustment member, it has less influence on the wind field close to the upper and lower portions of the beam body model. Here, "close" should be understood to mean that it is possible to facilitate the simultaneous mounting of the adjustment member and the displacement measuring member in a state of being close to each other without affecting the performance of each other's functions. The distance "close" to each other may be selected to be 30-100 mm.

Preferably, each of the displacement measuring members comprises a displacement sensor located below the corresponding cantilever rod, the displacement sensor being communicatively connected to a data acquisition terminal. The data acquisition terminal may be a computer, and the displacement sensor may be connected to the computer via a wired network data line, or connected to the computer via wireless Bluetooth communication.

Preferably, the displacement sensor is provided on a mounting seat, and the mounting seat is fixed on the base.

Preferably, the displacement sensor is an electronic micrometer, and a wedge block is further provided between the cantilever rod and the electronic micrometer. The upper end of the electronic micrometer is connected to a wedge block, and the wedge block is further connected to a cantilever rod, so that the cantilever rod can accurately transmit vibration to the wedge block during vibration response. The wedge block has a large area, and is convenient to act on the end of the electric micrometer, so that the cantilever rod can measure vibration response data of the cantilever rod. In an initial state, the top of the electronic micrometer contacts the wedge block, the wedge block is provided on the cantilever rod or on the electronic micrometer, and the wedge block contacts the cantilever rod to form a state of mutual contact, with very little damping, which can be almost considered as non-inductive contact.

Preferably, an inclined plane of the wedge block is connected below the cantilever rod, and an upper end of the electronic micrometer is in contact with the bottom of the wedge block, so that the wedge block can make stable contact with both the cantilever rod and the electronic micrometer, respectively.

Preferably, the wedge block is a plastic or foam structural member to further reduce damping of the cantilever rod.

Preferably, the cantilever rod is a cantilever steel wire, and the cantilever steel wire has a circular cross section, a larger density and a larger elastic modulus, and is convenient to be taken as a material for the wind tunnel test of the cantilever rod. Of course, if some materials having the circular cross section consistent with the steel wire possess a lighter density and a larger elastic modulus, they also meet the material requirement for the cantilever rod required by the present invention.

Preferably, the diameter of the cantilever rod is 4-6 mm, and the length of the cantilever rod is determined according to practical requirements, 500-1000 mm.

Preferably, the beam body model has a width of 200-300 mm, a height of 30-50 mm, and a length of 6-10 m. The length, width and height parameters of the beam body model are obtained according to the scale ratio of the main beam of the suspension bridge or the cable-stayed bridge, and are selected according to the actual main beam parameters.

Preferably, all of the adjustment members are equidistantly and parallelly disposed on the base so that all of the cantilever rods are equidistantly and parallelly disposed to facilitate improved stability and simulation accuracy of the beam body model.

Preferably, both ends of the beam body model are provided with the adjustment member and the cantilever rod.

Since each adjustment member is connected to a cantilever rod and the cantilever rod can be constrained, the both ends of the beam body model are constrained with both ends of the beam body model being provided with an adjustment member and a cantilever rod. With respect to the deficiency of using the both-end constraint form in the prior art, adding an additional damping to the model to directly affect the vortex vibration wind tunnel test results of the aeroelastic model of the model, thereby affecting the accuracy of the results, the present invention cancels complicated constraint boundary conditions (such as column constraint) at the both ends of the model, and directly constrains the beam body model by providing the adjustment member connected to the cantilever rod. Therefore, it can simplify the constraints of the both ends of the model system, eliminate the increase of additional damping caused by complex boundary support, and make the model test results more true and accurate.

Preferably, a sleeve is provided on each of the adjustment members, the sleeve including a through hole for the cantilever rod to pass through and fitting the same, and a locking nut for fastening the cantilever rod is radially provided on the through hole.

The sleeve provided on the adjustment member enables the cantilever rod to pass through the through hole on the sleeve, and the through hole is adapted to the cantilever rod, and can form a stable package for the cantilever rod, so that the adjustment member can provide a stable boundary condition of the model system for the stable constraint on one end of the cantilever rod, which improves the reliability adjustment and stability of the test.

Preferably, the sleeve has a length of 40-60 mm. The length of the sleeve is more than 10 times the diameter of the cantilever rod, providing stronger stability constraint on the cantilever rod.

Preferably, each of the adjustment members comprises a support mount fixed to the base, and the support mount and the sleeve are provided with an adjusting rod I and an adjusting rod II with adjustable angles, thereby facilitating angular adjustment of the cantilever rod to cantilever the adjustment member.

Preferably, each of the adjusting rod I and the adjusting rod II has one end hinged correspondingly to the sleeve, and the other end hinged to a sliding block; and the support mount is further provided with a sliding chute in a vertical direction and adapted to the sliding block, and the sliding block is further provided with a fastening nut for fixing the sliding block to the support mount. Thus, it is convenient to adjust the upper and lower heights of the cantilever rod by the adjustment member.

Preferably, the sliding chute is further provided with scale marks to enable quick adjustment of the cantilever rod height and angle in unison by the various adjustment members.

Preferably, the support mount is further provided with a clamping groove for the cantilever rod to pass through, and the size of the clamping groove is adapted to the diameter size of the cantilever rod, and the clamping groove helps to limit the left-right swing of the cantilever rod, so that the cantilever rod maintains a stable cantilevering state.

Preferably, the beam body model comprises a supporting member provided at an cantilever end of each of the cantilever rods, a core beam is provided on all the supporting members, and the core beam portions of two adjacent supporting members are covered with an outer housing. The shape of the outer housing is matched with the shape of the main girders of the formal suspension bridge and the cable-stayed bridge to achieve similar shape. A steel core beam can be selected as the core beam, and the core beam is not in direct contact with the surface of the outer housing so as to prevent providing additional stiffness and damping for the beam body model. The outer housing is arranged at intervals along the longitudinal direction of the beam body model so as to prevent adding additional damping and stiffness of the structure and affecting the accuracy of the test structure. The stiffness of the beam body model is provided by the core beam so as to ensure a similar stiffness.

Preferably, each of the supporting members comprises a flat plate for supporting the core beam, and two limiting blocks are provided on the flat plate for limiting the lateral displacement of the core beam.

Preferably, the flat plate is a cuboid plate made of a plastic or foam material, the flat plate is provided with a hole, and the cantilever end of the cantilever rod passes through the hole and is interconnected with the flat plate. A stable fixed flat plate is provided at the cantilever end of the cantilever rod, so as to provide a stable horizontal support for the beam body model. Compared with the existing point support for directly supporting the beam body model at the cantilever end of the cantilever rod and the beam body model is easily inclined horizontally relative to the wind field direction, the flat plate can provide a surface support, and can effectively guarantee a stable horizontal state of the beam body model relative to the wind field, so as to ensure the consistency of the test model with the actual situation of the project.

Preferably, the outer housing is a rectangular plastic structural member, an inner cavity of the outer housing is provided with a screw abutting along both upper and lower surfaces of the core beam, and the outer housing is provided with foam or plastic fillers along both lateral sides of the core beam. The outer housing can be made of ABS plate, and the filler in the outer housing can be made of plastic, so as to inflate the structure of the outer housing and prevent the deformation of the beam body model structure caused by excessive wind force in the wind field, and at the same time, without adding mass damping.

The present invention also provides a test method for the high-order vortex vibration wind tunnel test model system for a long-span bridge, comprising the steps of:

Step 1, base installment, installing the base in a wind field for a wind tunnel test;

Step 2, adjustment member installment, installing several adjustment members on the base equidistantly and at intervals;

Step 3, cantilever rod installment, installing the cantilever rod on each of the adjustment members, and adjusting the cantilever length and angle of the cantilever rod, so that all the cantilever rods are consistent, and the cantilever ends of all the cantilever rods face the direction of the head-on wind towards the wind field in the wind tunnel test;

Step 4, assembling a beam body model, and after the beam body model is assembled, mounting the same on all the cantilever rods;

Step 5, displacement measuring member installment, arranging the displacement measuring member below the cantilever rod, so that the horizontal distance between the displacement measuring member and the beam body model exceeds 2 times a width value of the beam body model;

Step 6, starting a wind field, the beam body model generating vibration under the action of the wind field, and the displacement measurement device collecting amplitude and frequency data of the position of the cantilever rod located above; and Step 7, obtaining a displacement time-history response of the beam body model according to a vibration mode of the cantilever rod.

The test method for a high-order vortex vibration wind tunnel test model system of a long-span bridge according to the present invention comprises: firstly installing a base, installing an adjustment member, then installing a cantilever rod, assembling a beam body model, then arranging a displacement measuring member below the cantilever rod, and the horizontal distance between the displacement measuring member and the beam body model exceeding 2 times the width value of the beam body model, and starting a wind field, i.e. collecting amplitude and frequency data of the position of the cantilever rod above via a displacement measurement device, thereby obtaining a displacement time-history response of the beam body model according to the vibration mode of the cantilever rod. The test method is easy to operate and reliable, which can effectively reduce the damping of the model system, further improve the accuracy of the technical parameters of the model, and improve the reliability of the wind tunnel test data. The test method is simple and reliable, which effectively reduces the damping of the model system and improves the accuracy of the model technical parameters. It improves the real reliability of the wind tunnel test data, and can effectively meet the requirements of the high-order vortex vibration wind tunnel test for the long-span bridge. It is helpful to the study of high-order modal vortex vibration wind tunnel test for long-span bridges, and can provide technical support for multi-order vortex vibration damping for long-span flexible bridges built and wind resistance design of new bridges. The test method of the high-order vortex vibration wind tunnel test model system for a long-span bridge according to the present invention is also applicable to the study of low-order vortex vibration wind tunnel test.

Preferably, in Step 3, the height of the corresponding cantilever rod is firstly adjusted by the adjustment member, and then the angle of the cantilever rod is adjusted, so that the height of the cantilever end of the cantilever rod is consistent with the cantilever end of the other cantilever rods, and all the cantilever ends are located in the horizontal direction; and then each cantilever rod is fixed on the corresponding adjustment member.

Compared with the prior art, the invention has the following beneficial effects.

1. The present invention discloses a high-order vortex vibration wind tunnel test model system for a long-span bridge. The base is provided with a plurality of adjustment members, each of the adjustment members is provided with a cantilever rod, and all of the cantilever rods are cantilevered in the same direction; a beam body model is provided on a cantilevered end of all of the cantilever rods; a displacement measuring member is provided below the cantilever rod, and the horizontal distance between the displacement measuring member and the beam body model exceeds 2 times a width value of the beam body model, the displacement measuring member being away from the surface of the beam body model and the position of directly below the beam body model. Therefore, the state response data of the position of the cantilever rod can be collected in real time. By calculating the state response data of the cantilever end of the cantilever beam, the state response data of the beam body model is obtained. This method can not only overcome the deficiency that the change of the aerodynamic profile caused by arranging the sensor on the surface of the model in the traditional aeroelastic model increases the damping of the model, and the technical parameters of the model do not meet the test requirements, seriously affecting the accuracy and authenticity of the wind tunnel test results, and can solve the problem that the placement of sensors will bring turbulence to the wind field, thus increasing the wind field damping of the model, with uncertainty, also leading to be unable to accurately evaluate the impact on the wind field simulation results. The present invention thus effectively reduces the damping of the model system, further improves the accuracy of the model technical parameters, and improves the real reliability of the wind tunnel test data. The test model system is able to effectively meet the requirements of high-order vortex vibration wind tunnel test for long-span bridges and contributes to the study of high-order modal vortex vibration wind tunnel test for long-span bridges. It can provide technical support for multi-order vortex vibration damping for long-span flexible bridges built and wind resistance design of new bridges.

2. In the test model system according to the present invention, the both ends of the beam body model are constrained with both ends of the beam body model being provided with an adjustment member and a cantilever rod. With respect to the deficiency of using the both-end constraint form in the prior art, adding an additional damping to the model to directly affect the vortex vibration wind tunnel test results of the aeroelastic model of the model, thereby affecting the accuracy of the results, the present invention cancels complicated constraint boundary conditions (such as column constraint) at the both ends of the model, and directly constrains the beam body model by providing the adjustment member connected to the cantilever rod. Therefore, it can simplify the constraints of the both ends of the model system, eliminate the increase of additional damping caused by complex boundary support, and make the model test results more true and accurate.

3. According to the test model system of the present invention, by adjusting the sleeve provided on the component, the cantilever rod can pass through the through hole on the sleeve, and the through hole is adapted to the cantilever rod, and can form a stable package for the cantilever rod, so that the adjustment member can provide a stable boundary condition of the model system on the stable constraint of one end of the cantilever rod, which improves the reliability adjustment and stability of the test.

4. According to the test model system of the present invention, each of the supporting members comprises a flat plate for supporting the core beam, and it is provided on the flat plate so as to pass through the cantilever end of the cantilever rod, thereby enabling horizontal support for the beam body model to be stable. Compared with the existing point support for directly supporting the beam body model at the cantilever end of the cantilever rod and the beam body model is easily inclined horizontally relative to the wind field direction, the flat plate can provide a surface support, and can effectively guarantee a stable horizontal state of the beam body model relative to the wind field; and two limiting blocks are provided on the flat plate to limit the lateral displacement of the core beam so as to ensure the consistency of the test model with the actual situation of the project.

5. The test method for a high-order vortex vibration wind tunnel test model system of a long-span bridge according to the present invention comprises: firstly installing a base, installing an adjustment member, then installing a cantilever rod, assembling a beam body model, then arranging a displacement measuring member below the cantilever rod, and the horizontal distance between the displacement measuring member and the beam body model exceeding 2 times the width value of the beam body model, and starting a wind field, i.e. collecting amplitude and frequency data of the position of the cantilever rod above via a displacement measurement device, thereby obtaining a displacement time-history response of the beam body model according to the vibration mode of the cantilever rod. The test method is easy to operate and reliable, which can effectively reduce the damping of the model system, further improve the accuracy of the technical parameters of the model, and improve the reliability of the wind tunnel test data. It can effectively meet the requirements of high-order vortex vibration wind tunnel test for long-span bridges.

REFERENCE NUMERALS IN THE DRAWINGS

1, a cantilever rod; 2, a base; 3, an adjustment member; 31, a support mount; 311, a sliding chute; 312, a clamping groove; 32, a sliding block; 33, a fastening nut; 34, an adjusting rod I; 35, an adjusting rod II; 36, a scale mark; 4, a sleeve; 41, a through hole; 42, a locking nut; 5, a displacement measuring member; 51, a displacement sensor; 52, a mounting seat; 53, a wedge block; 54, a data acquisition terminal; 6, a beam body model; 7, a core beam; 8, a supporting member; 81, a flat plate; 82, a limiting block; 9, an outer housing; 91, a screw; 92, a filler.

DETAILED DESCRIPTION OF THE INVENTION

The present invention will now be described in further detail with reference to experimental examples and specific embodiments. However, it should not be understood that the scope of the above-described subject matter of the present invention is limited to the following embodiments, and the technology implemented based on the disclosure is within the scope of the present invention.

Embodiment 1

As shown in FIGS. 2-5, a high-order vortex vibration wind tunnel test model system for a long-span bridge comprises a base 2, wherein the base 2 is provided with a plurality of adjustment members 3, each of the adjustment members 3 is provided with a cantilever rod 1, and all of the cantilever rods 1 are cantilevered in the same direction; each of the adjustment members 3 can adjust the position and the cantilever angle of the cantilever rod 1 clamped, and a beam body model 6 is provided on on a cantilever end of all of the cantilever rods 1; and a displacement measuring member 5 is provided below each of the cantilever rods 1, and a horizontal interval l of the displacement measuring member 5 with respect to the beam body model 6 exceeds 2 times a width value of the beam body model 6. Herein, l is the interval mark as indicated by the dashed line in FIG. 4.

According to a high-order vortex vibration wind tunnel test model system for a long-span bridge of the present invention, several adjustment members 3 are provided on the base 2, a cantilever rod 1 is provided on each adjustment member 3, all the cantilever rods 3 are cantilevered in the same direction, and a beam body model 6 is provided on the cantilevered end of all the cantilever rods 1. Since the cantilever rod 1 is equivalent to a cantilever beam structure with one end fixed and one end free and the length, density and cross section thereof are fixed, the modal vibration mode of the cantilever rod 1 is also fixed, and the ratio of the vibration response of the cantilevered end of the cantilever rod 1 to the vibration response at any position along the length of the cantilever rod 1 is fixed. According to the response data of a certain position of the cantilever rod 1 collected by the first-order modal vibration mode and the displacement measuring member 5, the vibration response of any position on the length of the cantilever rod 1 can be obtained, including the vibration response of the cantilever end of the cantilever rod 1, i.e. the vibration response of the beam body model 6 above the cantilever rod can be correspondingly obtained.

Figure 14:
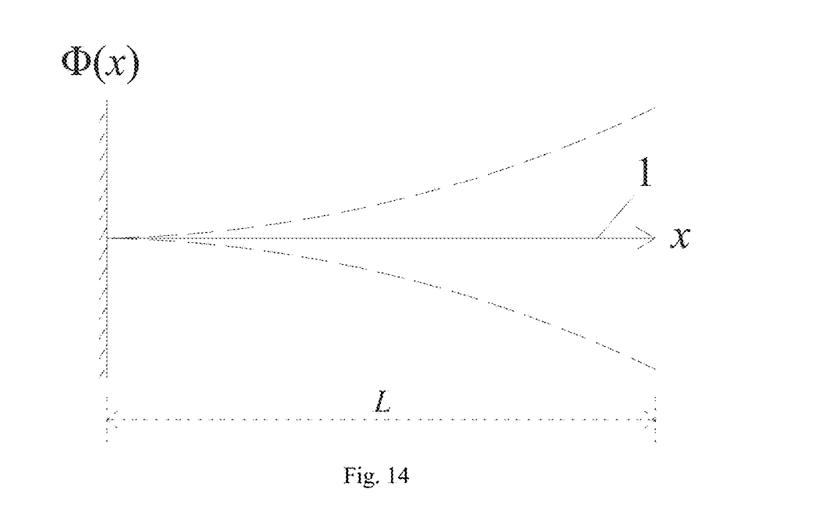
FIG. 14 is a schematic view of a mode of vibration of the cantilever rod in FIG. 3.

Specifically, as shown in FIG. 14, a schematic diagram of a vibration mode of the cantilever rod 1 is shown, with a boundary condition where one end of the cantilever rod 1 is fixed and the other end is free, and the frequency equation of the cantilever rod with a constant cross section is as follows:

$$\cos aL \cos haL = -1$$

The main mode function corresponding to the first order natural frequency of the cantilever rod with one end fixed and one end free is as follows:

$$\phi(x) = \cos ax - \cos ax - \frac{(\cos aL + \cosh aL)}{(\sin aL + \sinh aL)}(\sin ax - \sinh ax)$$

The above-mentioned $\phi(x)$ is the vibration displacement of the cantilever rod, aL is the root of the frequency equation, and x is the length of a certain position of the cantilever rod from the fixed end. aL can be obtained by solving the frequency equation using a graphical method. Detailed solving process of the graphical method can be found in the reference (R. Kraft, J. Pengjin. Structural Dynamics (2nd Edition) (revised edition) [M]. Higher Education Press, 2006.).

In the present invention, the displacement measuring member 5 is arranged below the cantilever rod 1, and the horizontal distance l between the displacement measuring member 5 and the beam body model exceeds 2 times a width value of the beam body model 6, and is far away from the surface of the beam body model 6 and the position directly below the beam body model 6. It can not only collect the state response data of the position of the cantilever rod 1 in real time to calculate the state response data of the cantilever end of the cantilever rod 1, namely, the state response data of the beam body model 6 can be obtained, which not only overcomes the deficiency that the change of the aerodynamic profile caused by arranging the sensor on the surface of the model in the traditional aeroelastic model increases the damping of the model, and the technical parameters of the model do not meet the test requirements, seriously affecting the accuracy and authenticity of the wind tunnel test results, and solves the problem that the placement of sensors will bring turbulence to the wind field, thus increasing the wind field damping of the model, with uncertainty, also leading to be unable to accurately evaluate the impact on the wind field simulation results. The present invention thus effectively reduces the damping of the model system, further improves the accuracy of the model technical parameters, and improves the real reliability of the wind tunnel test data, which is able to effectively meet the requirements of high-order vortex vibration wind tunnel test for long-span bridges and contributes to the study of high-order modal vortex vibration wind tunnel test for long-span bridges. It can provide technical support for multi-order vortex vibration damping for long-span flexible bridges built and wind resistance design of new bridges. Due to the high requirements of high-order vortex vibration wind tunnel test, the high-order vortex vibration wind tunnel test model system for the long-span bridge of the present invention is also applicable to the study of low-order vortex vibration wind tunnel test when it can meet the requirements of high-order vortex vibration wind tunnel test.

It should be noted that after the experimental study, the displacement measuring member 5 according to the present invention is located at a position of a distance of twice the width of the beam body model 6 from the wake flow or downstream of the beam body model 6, and the influence of the displacement measuring member 5 on the vortex of the wake flow in the wind field and the disturbance of the flow field is very small and can be almost ignored. Meanwhile, when measuring the vibration response parameter of the cantilever rod 1, the displacement measuring member 5 makes measurement in contact or not in contact, hardly damping the cantilever rod 1, and can be regarded as a non-inductive displacement measuring member 5.

The above-mentioned displacement measuring member 5 is located at a position below the cantilever rod 1 close to the adjustment member 3. The displacement measuring member 5 is located between the adjustment member 3 and the cantilever end. When the displacement measuring member 5 is closer to the adjustment member 3, it has less influence on the wind field close to the upper and lower portions of the beam body model 6. Here, "close" should be understood to mean that it is possible to facilitate the simultaneous mounting of the adjustment member 3 and the displacement measuring member 5 in a state of being close to each other without affecting the performance of each other's functions. The distance "close" to each other may be selected to be 30-100 mm.

Each of the displacement measuring member 5 comprises a displacement sensor 51 below the corresponding cantilever rod 1, the displacement sensor 51 being communicatively connected to a data acquisition terminal 54. The data acquisition terminal 54 may be a computer, and the displacement sensor 51 may be connected to the computer via a wired network data line, or connected to the computer via wireless Bluetooth communication.

Figure 8:
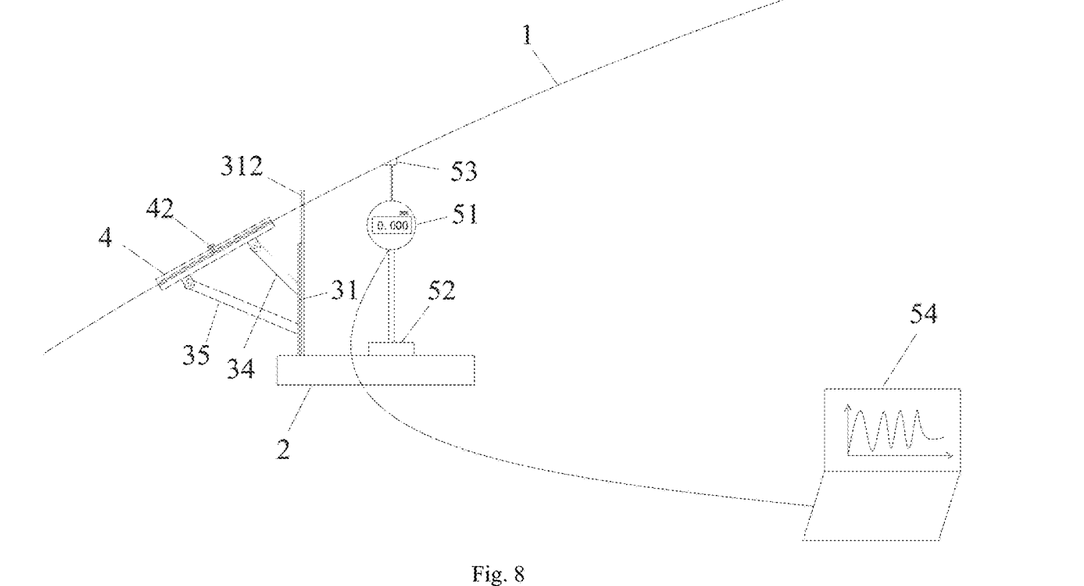
FIG. 8 is an enlarged view showing a positional relationship between a cantilever rod, a base and an adjustment member in FIG. 5.

As shown in FIG. 8, the displacement sensor 51 is provided on a mounting seat 52, and the mounting seat 52 is fixed on the base 2. The displacement sensor 51 is an electronic micrometer, and a wedge block 53 is further provided between the cantilever rod 1 and the electronic micrometer. The upper end of the electronic micrometer 53 is connected to a wedge block, and the wedge block 53 is further connected to a cantilever rod 1, so that the cantilever rod 1 can accurately transmit vibration to the wedge block 53 during vibration response. The wedge block 53 has a large area, and is convenient to act on the end of the electric micrometer, so that the cantilever rod 1 can measure vibration response data of the cantilever rod. In an initial state, the top of the electronic micrometer contacts the wedge block 53, the wedge block 53 is provided on the cantilever rod or on the electronic micrometer, and the wedge block 53 contacts the cantilever rod 1 to form a state of mutual contact, with very little damping, which can be almost considered as non-inductive contact.

Further, an inclined surface of the wedge block 53 is connected below the cantilever rod 1, and an upper end of the electronic micrometer is in contact with the bottom of the wedge block 53, so that the wedge block 53 can make stable contact with both the cantilever rod 1 and the electronic micrometer, respectively. The wedge block 53 is a plastic or foam structural member to further reduce damping of the cantilever rod 1.

The above-mentioned cantilever rod 1 is a cantilever steel wire, and the cantilever steel wire has a circular cross section, a larger density and a larger elastic modulus, and is convenient to be taken as a material for the wind tunnel test of the cantilever rod 1. Of course, if some materials having the circular cross section consistent with the steel wire possess a lighter density and a larger elastic modulus, they also meet the material requirement for the cantilever rod 1 required by the present invention. The diameter of the cantilever rod 1 is 4-6 mm, and the length of the cantilever rod 1 is determined according to practical requirements, for example, 500-1000 mm.

Figure 3:
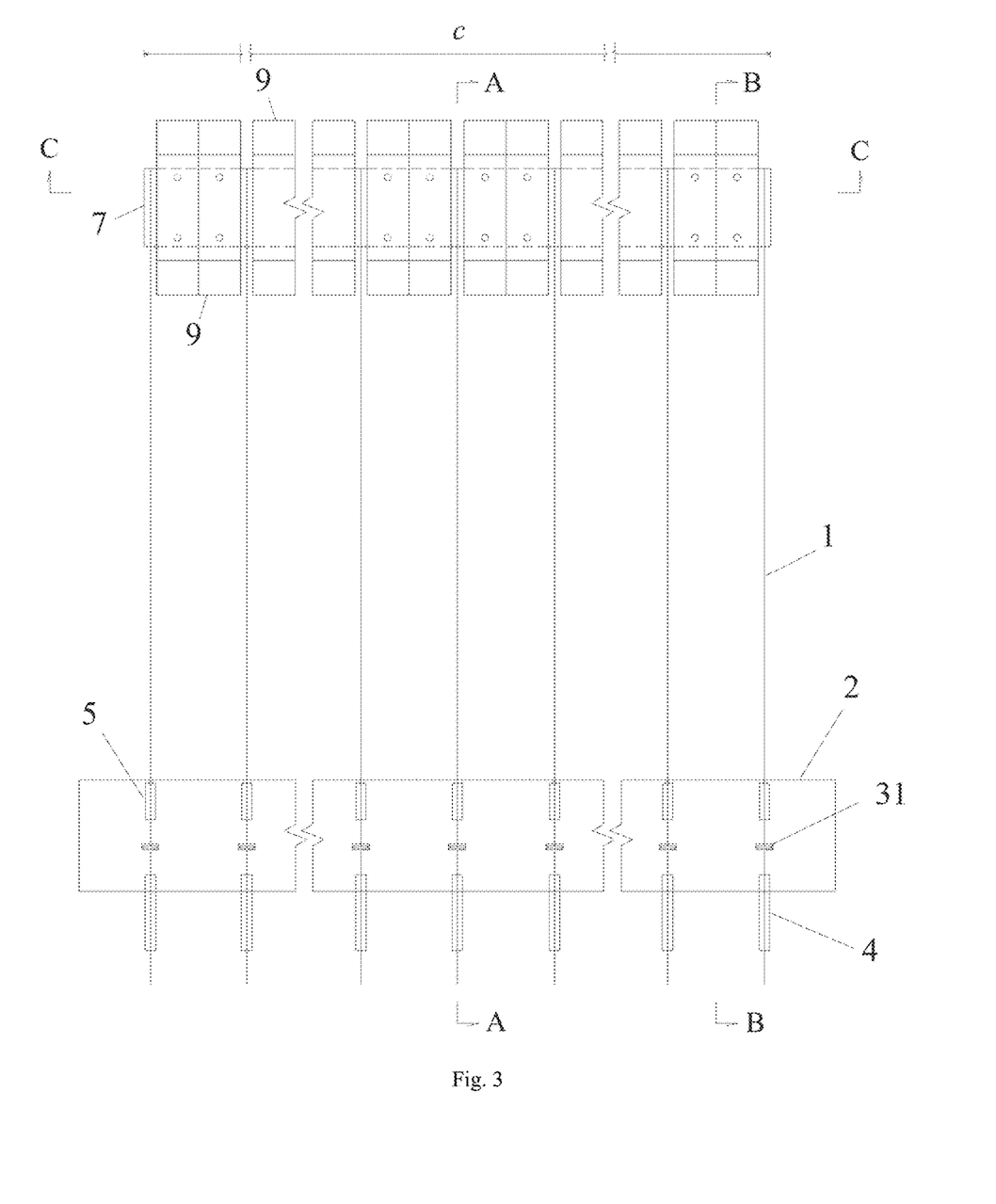
FIG. 3 is a structural plan view of a high-order vortex vibration wind tunnel test model system for a long-span bridge according to the present invention.
Figure 4:
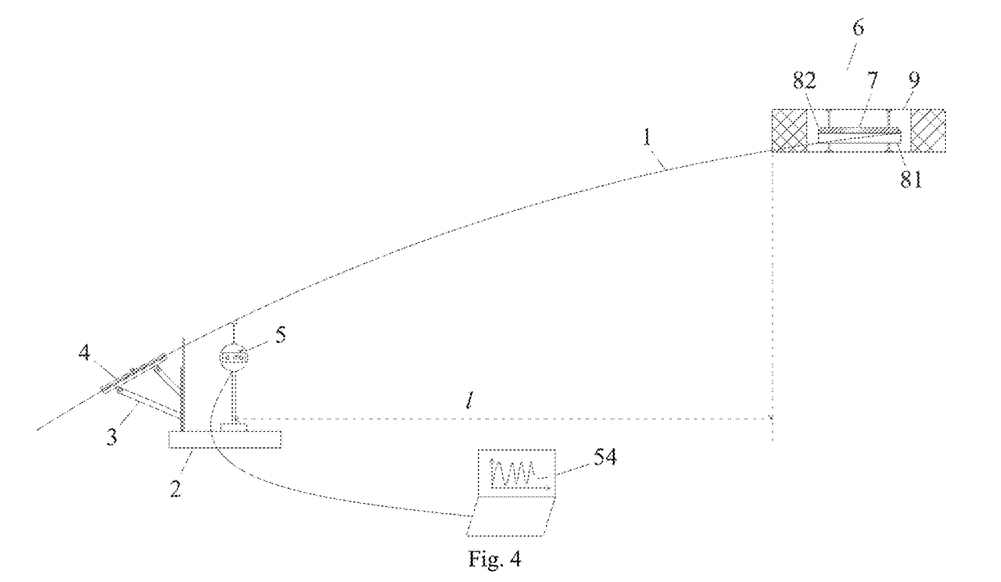
FIG. 4 is a schematic cross-sectional view of A-A in FIG. 3.
Figure 5:
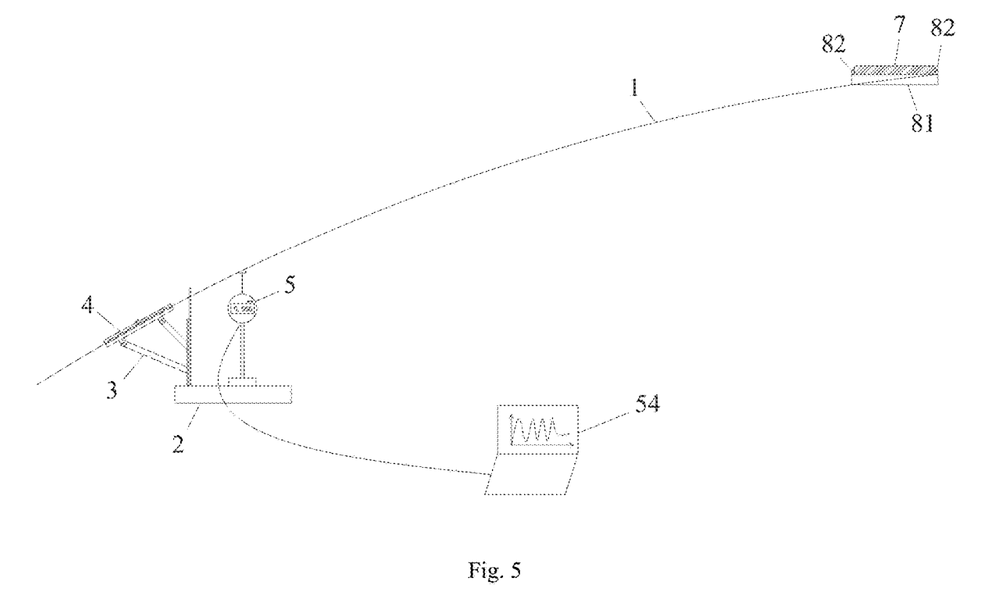
FIG. 5 is a schematic cross-sectional view of A-A in FIG. 3.
Figure 6:
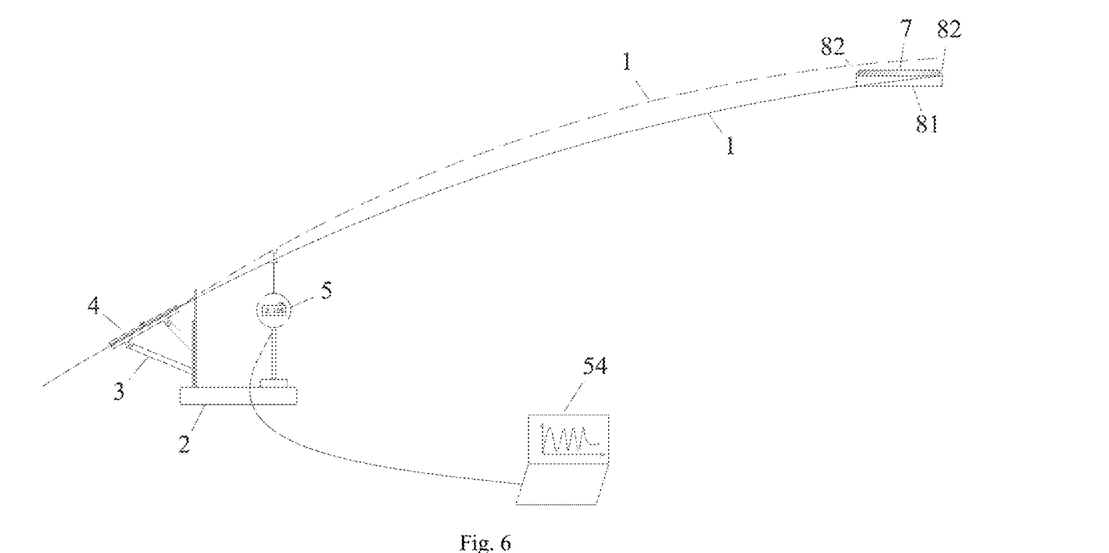
FIG. 6 is a schematic view of a cantilever rod of FIG. 5 being vibrated and displaced up and down.
Figure 12:
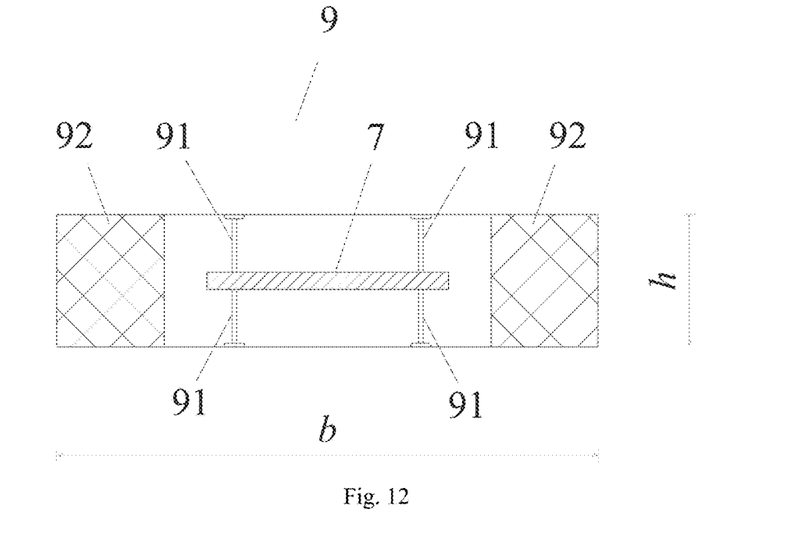
FIG. 12 is a schematic cross-sectional view of B-B in FIG. 3.

The width b of the beam body model 6 used in the present embodiment is 200-300 mm, the height h is 30-50 mm, and the length c is 6-10 m. As shown in FIGS. 3 and 12, the length, width and height parameters of the beam body model 6 are obtained according to the scale ratio of the main beam size of a suspension bridge or a cable-stayed bridge, and are selected according to the actual main beam parameters. Then, if the horizontal distance l of the displacement measuring member 5 with respect to the beam body model 6 exceeds 2 times the width value of the beam body model 6, a distance of 400-600 mm may be selected.

All the adjustment members 3 of the present embodiment are arranged equidistantly and parallelly on the base 2, so that all the cantilever rods 1 are arranged equidistantly and parallelly, so as to improve the stability and simulation accuracy of the beam body model 6.

Figure 2:
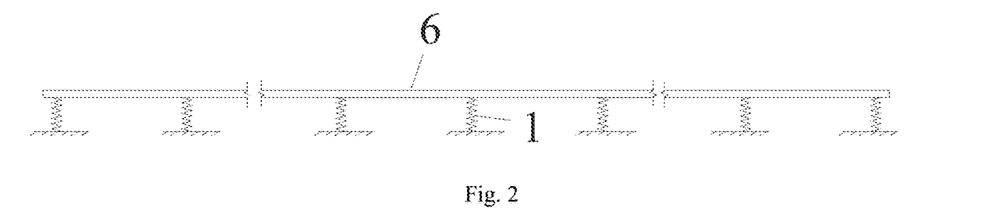
FIG. 2 is a schematic diagram showing an aeroelastic model of a high-order vortex vibration wind tunnel test model system for a long-span bridge according to the present invention.

In particular, both ends of the beam body model 6 are provided with the adjustment member 3 and the cantilever rod 1. Since each adjustment member 3 is connected to a cantilever rod 1 and the cantilever rod 1 can be constrained, the both ends of the beam body model 6 are constrained with both ends of the beam body model 6 being provided with an adjustment member 3 and a cantilever rod 1. With respect to the deficiency of using the both-end constraint form in the prior art, adding an additional damping to the model to directly affect the vortex vibration wind tunnel test results of the aeroelastic model of the model, thereby affecting the accuracy of the results, as shown in FIG. 2, the present invention cancels complicated constraint boundary conditions (e.g. cancelling the column constraint of the both ends of the aeroelastic model in the prior art as shown in FIG. 1) at the both ends of the model, and directly constrains the beam body model 6 by providing the adjustment member 3 connected to the cantilever rod 1. Therefore, it can simplify the constraints of the both ends of the model system, eliminate the increase of additional damping caused by complex boundary support, and make the model test results more true and accurate.

As shown in FIGS. 8-11, each of the above-mentioned adjustment members 3 is provided with a sleeve 4, which comprises a through hole 41 through which the cantilever rod 1 can pass and fit with, and a locking nut 42 for fastening the cantilever rod 1 is radially provided to the through hole 41. The sleeve 4 provided on the adjustment member 3 can enable the cantilever rod 1 to pass through the through hole 41 on the sleeve 4, and the through hole 41 is adapted to the cantilever rod 1, and can form a stable package on the cantilever rod 1 to form an integral structural member, so that the adjustment member 3 can provide a stable boundary condition of the model system for the stable constraint on one end of the cantilever rod 1, which improves the reliability adjustment and stability of the test. Further, the length of the sleeve 4 is 40-60 mm. The length of the sleeve 4 is more than 10 times the diameter of the cantilever rod 1, providing stronger stability constraint on the cantilever rod 1.

Figure 9:
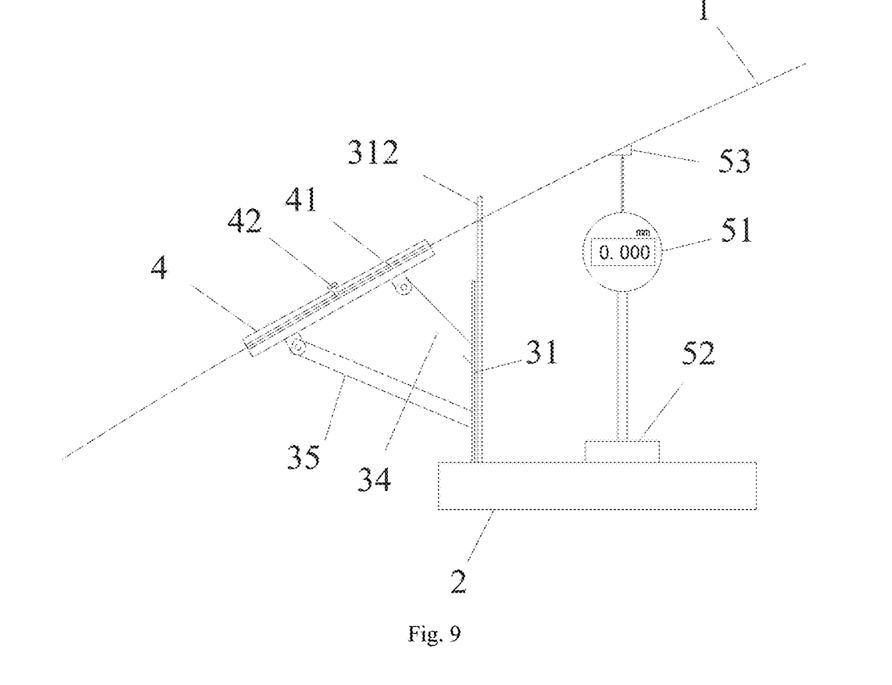
FIG. 9 is a structurally schematic view of a part in FIG. 8.
Figure 10:
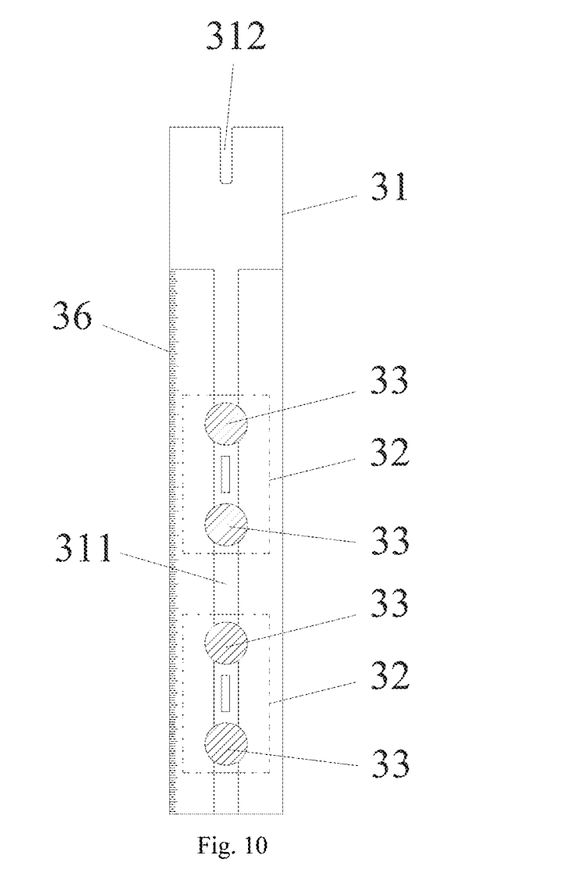
FIG. 10 is a side view of a support mount of FIG. 9.
Figure 11:
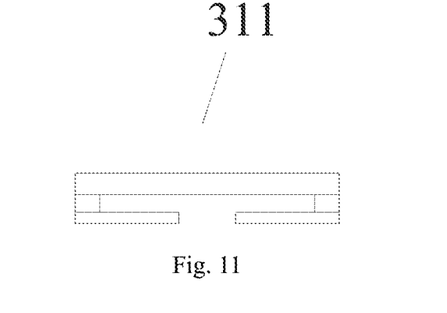
FIG. 11 is a top view of a sliding chute of FIG. 10.

Each of the above-mentioned adjustment members 3 comprises a support seat 31 fixed on the base 2, and the support seat 31 and the sleeve 4 are provided with an adjusting rod I 34 and an adjusting rod II 35 with adjustable angles, thereby facilitating the angular adjustment of the cantilever rod 1 to cantilever the adjustment member 3. Specifically, an angular adjustment and a horizontal adjustment of the entire cantilever lever 1 are realized by adjusting the positions of the adjusting rod I 34 and the adjusting rod II 35, so that the cantilever end is adjusted in a horizontal direction. The adjusting rod I 34 and the adjusting rod II 35 are both hinged at one end to the corresponding sleeve 4, and are each hinged at the other end to the sliding block 32; the support seat 31 is further provided with a sliding chute 311 in the vertical direction and adapted to the two sliding blocks 32; and the sliding block 32 is further provided with a fastening nut 33 for fixing the sliding block 32 to the support seat 31. Thus, the upper and lower height adjustment of the cantilever rod 1 is facilitated by the adjustment member 3. The sliding chute 311 is further provided with scale marks to enable quick adjustment of the cantilever rod 1 height and angle in unison by the various adjustment members 3. A clamping groove 312 capable of passing through the cantilever rod 1 is further provided on the support seat 31, the size of the clamping groove 312 is adapted to the diameter size of the cantilever rod 1, the clamping groove 312 helps to limit the left-right swing of the cantilever rod 1, so that the cantilever rod 1 remains in a stable cantilever state. At the same time, the vertical height of the notch of the clamping groove 312 is greater than the amplitude range of the cantilever rod 1, so as to ensure that the cantilever rod 1 is not restricted in vertical movement.

Figure 13:
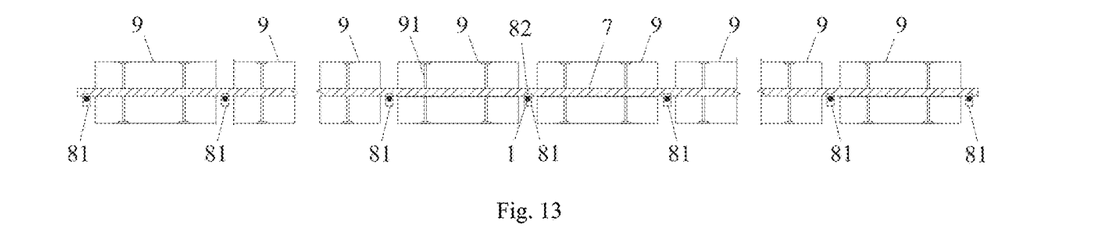
FIG. 13 is a schematic cross-sectional view of C-C in FIG. 3.

As shown in FIGS. 12 and 13, the above-mentioned beam body model 6 comprises supporting members 8 provided at the cantilever ends of each cantilever rod 1, the core beams 7 are provided on all the supporting members 8, and the core beams 7 of two adjacent supporting members 8 are partially covered with an outer housing 9. The shape of the outer housing 9 is matched with the shape of the main girders of the formal suspension bridge and the cable-stayed bridge to achieve similar shape. A steel core beam 7 can be selected as the core beam 7, and the core beam 7 is not in direct contact with the surface of the outer housing 9 so as to prevent providing additional stiffness and damping for the beam body model 6. The outer housing 9 is arranged at intervals along the longitudinal direction of the beam body model 6 so as to prevent adding additional damping and stiffness of the structure and affecting the accuracy of the test structure. The stiffness of the beam body model 6 is provided by the core beam 7 so as to ensure a similar stiffness.

It should be noted that the outer housings 9 are spaced apart along the longitudinal direction of the beam body model 6. FIG. 3 shows that the outer housings 9 are spaced apart on the left and right sides of each cantilever rod 1, the size of the gap is slightly larger than the diameter of the cantilever rod 1, and the range of the gap is 10-15 mm.

Figure 7:
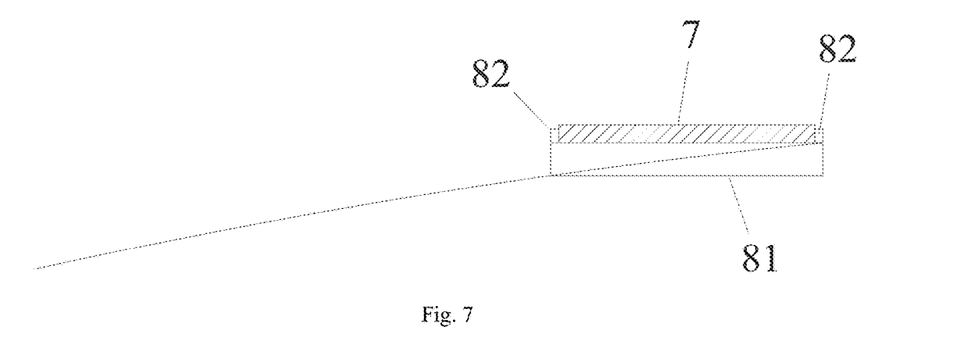
FIG. 7 is an enlarged view of a core beam of FIG. 5 engaged with a supporting member.

Each of the supporting members 8 comprises a flat plate 81 for supporting the core beam 7, and two limit blocks 82 provided on the flat plate 81 for limiting the lateral displacement of the core beam 7. As shown in FIG. 7, the width of the flat plate 81 is slightly larger than the diameter of the cantilever rod 1, such as 8-15 mm, so that the cantilever rod 1 can stably pass through the flat plate 81 and be wrapped by the flat plate 81. In addition, the flat plate 81 can be placed in the gap between two adjacent outer housings 9, which is slightly smaller than the gap between the two outer housings 9. Further, the flat plate 81 is a cuboid flat plate 81 made of plastic or foam, the flat plate 81 is provided with a hole, and the cantilever end of the cantilever rod 1 passes through the hole and is interconnected with the flat plate 81. A stable fixed horizontal plate 81 is provided at the cantilever end of the cantilever rod 1, so as to provide a stable horizontal support for the beam body model 6. Compared with the existing point support for directly supporting the beam body model 6 at the cantilever end of the cantilever rod 1 and the beam body model 6 is easily inclined horizontally relative to the wind field direction, the horizontal plate 81 can provide a surface support, and can effectively guarantee a stable horizontal state of the beam body model 6 relative to the wind field, so as to ensure the consistency of the test model with the actual situation of the project. The outer housing 9 is a rectangular plastic structural member; the inner cavity of the outer housing 9 is provided with a screw 91 abutting along both the upper and lower surfaces of the core beam 7, wherein the upper end of the screw rod 91 located on the upper surface of the core beam 7 abuts against the top wall of the inner cavity of the outer housing 9; the lower end of the screw rod 91 located on the lower surface of the core beam 7 abuts against the bottom wall of the inner cavity of the outer housing 9; and the outer housing 9 is symmetrically provided with a foam or plastic filler 92 along both lateral sides of the core beam 7. The outer housing 9 can be made of ABS plate, and the filler 92 in the outer housing can be made of plastic, so as to inflate the structure of the outer housing 9 and prevent the deformation of the beam body model 6 structure caused by excessive wind force in the wind field, and at the same time, without adding mass damping.

Embodiment 2

Figure 15:
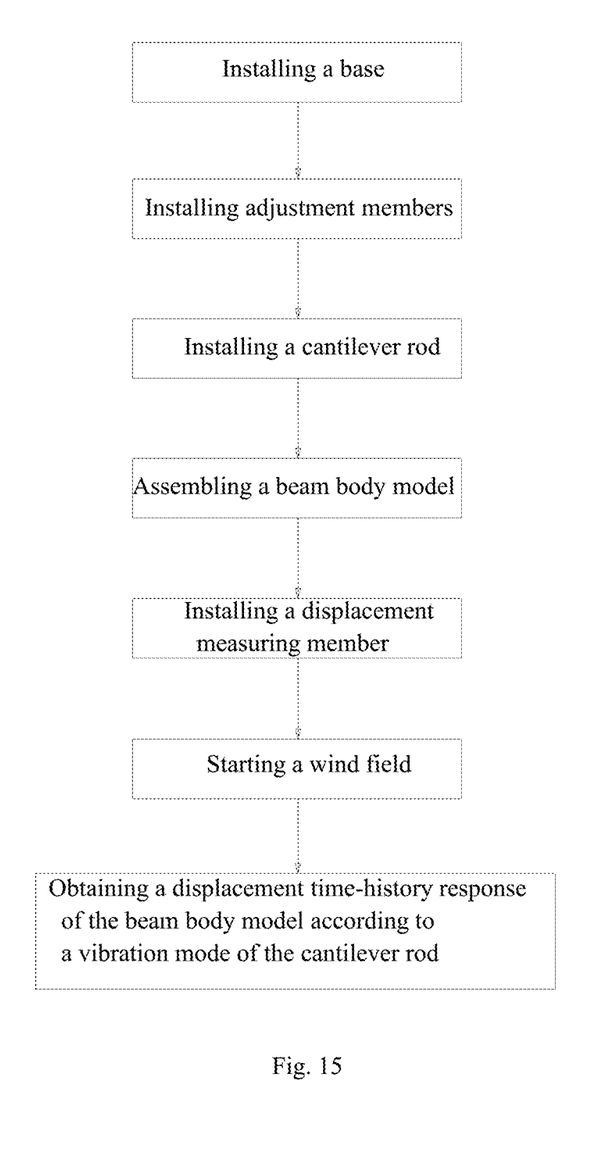
FIG. 15 is a flow chart of a high-order vortex vibration wind tunnel test model system test method for a long-span bridge according to the present invention.

As shown in FIG. 15, the present invention also provides a test method for the high-order vortex vibration wind tunnel test model system for a long-span bridge, comprising the steps of:

Step 1, base 2 installment, specifically, selecting a steel structure base 2 for the base 2 so as to ensure the stability of the structure, fixing the base in a wind tunnel test wind field laterally, so that the wind field windward face is perpendicular to the steel structure base 2;

Step 2, adjustment member 3 installment, installing several adjustment members 3 on the base 2 equidistantly and at intervals, wherein the adjustment member 3 comprises a support seat 31, an adjusting rod 134, an adjusting rod II 35 and a sleeve 4; a sliding chute 311 and a clamping groove 312 are provided on the support seat 31, a sliding block 32 is provided in the sliding chute 311, and a fastening nut 33 is provided on the sliding block 32; one ends of the adjusting rod 134 and the adjusting rod II 35 are hinged on the sliding block 32 at the same time, and the other ends of the adjusting rod 134 and the adjusting rod II 35 are hinged on the sleeve 4; and the support seat 31 is firstly vertically installed on the support seat 31, and then the clamping groove 312, the sliding block 32, the adjusting rod 134, the adjusting rod II 35 and the sleeve 4 are respectively mounted on the support seat 31.

Step 3, cantilever rod 1 installment, tightening the cantilever rod 1 in the sleeve 4 on each adjustment member 3, and adjusting the cantilever length of the cantilever rod 1, simultaneously adjusting the positions of the adjusting rod 134 and the adjusting rod II 35, and the position of the sliding block 32 in the sliding chute 311, with a scale mark 36 for precise adjustment, so as to achieve rapid and precise adjustment of the angle and height of the cantilever rod 1. Thus, the cantilever ends of all the cantilever rods 1 face the direction of the head-on wind towards the wind field in the wind tunnel test, and the angle and height of all the cantilever rods 1 are kept consistent. The cantilever ends of the cantilever rods 1 are located in the same horizontal direction and then each cantilever rod 1 is fastened on the corresponding sleeve 4 by means of a locking nut 42;

Step 4, assembling a beam body model 6, after the beam body model 6 is assembled, mounting the same on flat plates 81 of the cantilever ends of all the cantilever rods 1, and then performing limiting by a limiting block 82;

Step 5, installing a displacement measuring member 5, and arranging the displacement measuring member 5 below the cantilever rod 1, so that the horizontal distance l between the displacement measuring member 5 and the beam body model 6 exceeds 2 times the width value of the beam body model 6. The displacement measuring member 5 in the present embodiment uses an electronic micrometer, a mounting seat 52 at the bottom of the electronic micrometer is firstly fixed on the steel structure base 2 via a rubber rod and a rubber gun, and a pointer top support of the electronic micrometer contacts the bottom of the cantilever rod 1. Then a small triangular wedge block 53 is installed and fixed at a position between the cantilever rod 1 and the pointer (the length dimension of the inclined plane is selected to be within 20 mm), making the surface of the pointer top support be a horizontal surface, so as to ensure the accuracy of data collection of the electronic micrometer; and the electronic micrometer is connected to a computer via data line communication so as to realize real-time data collection;

Step 6, starting a wind field, the beam body model 6 generating vibration under the action of the wind field, and the displacement measurement device collecting amplitude and frequency data of the position of the cantilever rod 1 located above; and Step 7, obtaining a displacement time-history response of the beam body model 6 according to a vibration mode of the cantilever rod 1.

In the above-mentioned step 3, the height of the corresponding cantilever rod 1 is firstly adjusted by the adjustment member 3, and then the angle of the cantilever rod 1 is adjusted, so that the height of the cantilever end of the cantilever rod 1 is consistent with the cantilever end of other cantilever rods 1, and all the cantilever ends are located in the horizontal direction; and then each cantilever rod 1 is fixed on the corresponding adjustment member 3. The specific adjustment methods are as follows. Firstly, both ends of the adjusting rod II 35 located below are fixed and fastened, the adjusting rod 134 located above is firstly kept free, the adjusting rod 134 can freely slide in the sliding chute 311 on the support seat 31, so as to realize the adjustment of the angle and height of the cantilever rod 1. After adjusting the cantilever rod 1 to a specified position, the cantilever rod 1 is fastened by using a fastening nut 33, and finally the cantilever end of the cantilever rod 1 is inserted into a hole reserved on the cuboid flat plate 81 and fixed therein, so as to complete the adjustment of the cantilever rod 1.

The test method for a high-order vortex vibration wind tunnel test model system of a long-span bridge according to the present invention comprises: firstly installing a base 2, installing an adjustment member 3, then installing a cantilever rod 1, assembling a beam body model 6, then arranging a displacement measuring member 5 below the cantilever rod 1, and the horizontal distance l between the displacement measuring member 5 and the beam body model 6 exceeding 2 times the width value of the beam body model 6, and starting a wind field, i.e. collecting amplitude and frequency data of the position of the cantilever rod 1 above via a displacement measurement device, thereby obtaining a displacement time-history response of the beam body model 6 according to the vibration mode of the cantilever rod. The test method is simple and reliable, which effectively reduces the damping of the model system and improves the accuracy of the model technical parameters. It improves the real reliability of the wind tunnel test data, and can effectively meet the requirements of the high-order vortex vibration wind tunnel test for the long-span bridge. It is helpful to the study of high-order modal vortex vibration wind tunnel test for long-span bridges, and can provide technical support for multi-order vortex vibration damping for long-span flexible bridges built and wind resistance design of new bridges.

The above mentioned is only a better embodiment of the invention and is not intended to limit the invention. Any modification, equivalent substitution and improvement made within the spirit and principles of the invention shall be covered by the protection of the invention.

What is claimed:

1. A high-order vortex vibration wind tunnel test model system for a long-span bridge, comprising a base, wherein the base is provided with a plurality of adjustment members, each of the adjustment members is provided with a cantilever rod, and all of the cantilever rods are cantilevered in the same direction; each of the adjustment members can adjust the position and the cantilever angle of the cantilever rod clamped, and a beam body model is provided on a cantilever end of all of the cantilever rods; and a displacement measuring member is provided below each of the cantilever rods, and a horizontal interval of the displacement measuring member with respect to the beam body model exceeds 2 times a width value of the beam body model.

2. The high-order vortex vibration wind tunnel test model system for a long-span bridge according to claim 1, wherein the displacement measuring member is located at a position below the cantilever rod close to the adjustment member.

3. The high-order vortex vibration wind tunnel test model system for a long-span bridge according to claim 2, wherein each of the displacement measuring members comprises a displacement sensor located below the corresponding cantilever rod, the displacement sensor being communicatively connected to a data acquisition terminal.

4. The high-order vortex vibration wind tunnel test model system for a long-span bridge according to claim 3, wherein the displacement sensor is provided on a mounting seat, and the mounting seat is fixed on the base.

5. The high-order vortex vibration wind tunnel test model system for a long-span bridge according to claim 3, wherein the displacement sensor is an electronic micrometer, and a wedge block is further provided between the cantilever rod and the electronic micrometer.

6. The high-order vortex vibration wind tunnel test model system for a long-span bridge according to claim 5, wherein an inclined plane of the wedge block is connected below the cantilever rod, and an upper end of the electronic micrometer is in contact with the bottom of the wedge block.

7. The high-order vortex vibration wind tunnel test model system for a long-span bridge according to claim 6, wherein the wedge block is a plastic or foam structural member.

8. The high-order vortex vibration wind tunnel test model system for a long-span bridge according to claim 1, wherein the cantilever rod is a cantilever steel wire.

9. The high-order vortex vibration wind tunnel test model system for a long-span bridge according to claim 8, wherein the diameter of the cantilever rod is 4-6 mm.

10. The high-order vortex vibration wind tunnel test model system for a long-span bridge according to claim 1, wherein the beam body model has a width of 200-300 mm, a height of 30-50 mm, and a length of 6-10 m.

11. The high-order vortex vibration wind tunnel test model system for a long-span bridge according to claim 1, wherein all of the adjustment members are arranged equidistantly and in parallel on the base, so that all of the cantilever rods are arranged equidistantly and in parallel.

12. The high-order vortex vibration wind tunnel test model system for a long-span bridge according to claim 1, wherein both ends of the beam body model are provided with the adjustment member and the cantilever rod.

13. The high-order vortex vibration wind tunnel test model system for a long-span bridge according to claim 12, wherein a sleeve is provided on each of the adjustment members, the sleeve including a through hole for the cantilever rod to pass through and fitting the same, and a locking nut for fastening the cantilever rod is radially provided on the through hole.

14. The high-order vortex vibration wind tunnel test model system for a long-span bridge according to claim 13, wherein the length of the sleeve is 400-600 mm.

15. The high-order vortex vibration wind tunnel test model system for a long-span bridge according to claim 13, wherein each of the adjustment members comprises a support mount fixed to the base, and the support mount and the sleeve are provided with an adjusting rod I and an adjusting rod II with adjustable angles.

16. The high-order vortex vibration wind tunnel test model system for a long-span bridge according to claim 15, wherein the support mount is further provided with a clamping groove for the cantilever rod to pass through, and the size of the clamping groove is adapted to the diameter size of the cantilever rod.

17. The high-order vortex vibration wind tunnel test model system for a long-span bridge according to claim 15, wherein each of the adjusting rod I and the adjusting rod II has one end hinged correspondingly to the sleeve, and the other end hinged to a sliding block; and the support mount is further provided with a sliding chute in a vertical direction and adapted to the sliding block, and the sliding block is further provided with a fastening nut for fixing the sliding block to the support mount.

18. The high-order vortex vibration wind tunnel test model system for a long-span bridge according to claim 17, wherein the sliding chute is further provided with scale marks.

19. The high-order vortex vibration wind tunnel test model system for a long-span bridge according to claim 12, wherein the beam body model comprises a supporting member provided at an cantilever end of each of the cantilever rods, a core beam is provided on all the supporting members, and the core beam portions of two adjacent supporting members are covered with an outer housing.

20. The high-order vortex vibration wind tunnel test model system for a long-span bridge according to claim 19, wherein each of the supporting members comprises a flat plate for supporting the core beam, and two limiting blocks are provided on the flat plate for limiting the lateral displacement of the core beam.

21. The high-order vortex vibration wind tunnel test model system for a long-span bridge according to claim 20, wherein the flat plate is a cuboid plate made of a plastic or foam material, the flat plate is provided with a hole, and the cantilever end of the cantilever rod passes through the hole and is interconnected with the flat plate.

22. The high-order vortex vibration wind tunnel test model system for a long-span bridge according to claim 21, wherein the outer housing is a rectangular plastic structural member, an inner cavity of the outer housing is provided with a screw abutting along both upper and lower surfaces of the core beam, and the outer housing is provided with foam or plastic fillers along both lateral sides of the core beam.

23. A test method for the high-order vortex vibration wind tunnel test model system for a long-span bridge according to claim 1, comprising the following steps:
   Step 1, base installment, installing the base in a wind field for a wind tunnel test;
   Step 2, adjustment member installment, installing several adjustment members on the base equidistantly and at intervals;
   Step 3, cantilever rod installment, installing the cantilever rod on each of the adjustment members, and adjusting the cantilever length and angle of the cantilever rod, so that all the cantilever rods are consistent, and the cantilever ends of all the cantilever rods face the direction of the head-on wind towards the wind field in the wind tunnel test;
   Step 4, assembling a beam body model, and after the beam body model is assembled, mounting the same on all the cantilever rods;
   Step 5, displacement measuring member installment, arranging the displacement measuring member below the cantilever rod, so that the horizontal distance between the displacement measuring member and the beam body model exceeds 2 times a width value of the beam body model;
   Step 6, starting a wind field, the beam body model generating vibration under the action of the wind field, and the displacement measurement device collecting amplitude and frequency data of the position of the cantilever rod located above; and
   Step 7, obtaining a displacement time-history response of the beam body model according to a vibration mode of the cantilever rod.

24. The test method for the high-order vortex vibration wind tunnel test model system for a long-span bridge according to claim 23, wherein in Step 3, the height of the corresponding cantilever rod is firstly adjusted by the adjustment member, and then the angle of the cantilever rod is adjusted, so that the height of the cantilever end of the cantilever rod is consistent with the cantilever end of the other cantilever rods, and all the cantilever ends are located in the horizontal direction; and then each cantilever rod is fixed on the corresponding adjustment member.

* * * * *